Figure 1:
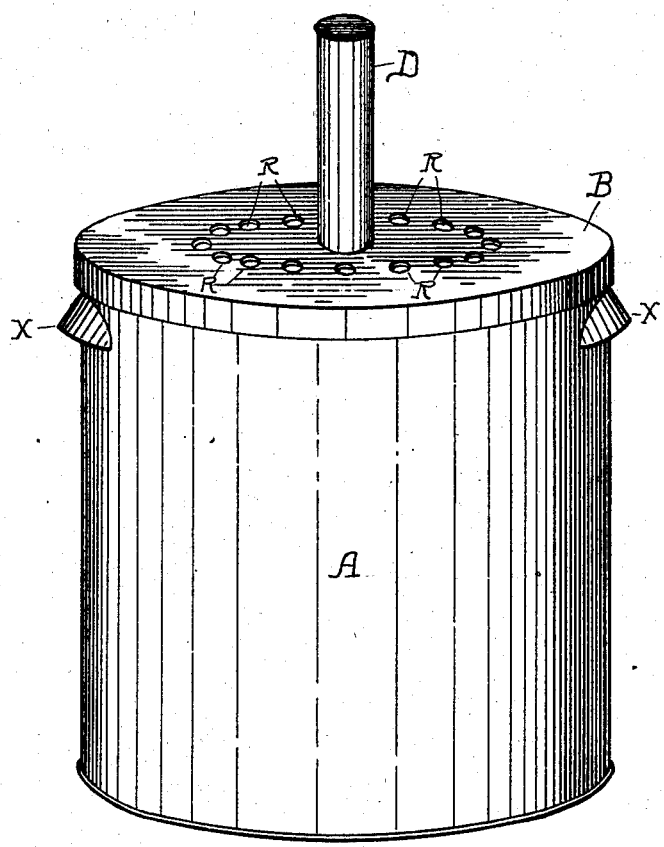

No. 720,043. PATENTED FEB. 10, 1903.
T. L. MARTIN.
PRESERVING DEVICE.
APPLICATION FILED MAY 19, 1902.
NO MODEL. 3 SHEETS—SHEET 1.

Witnesses:
S. C. Duvall.
R. E. Randle.

Inventor:
T. L. Martin;
by his attorney,
Robert W. Randle.

No. 720,043. PATENTED FEB. 10, 1903.
T. L. MARTIN.
PRESERVING DEVICE.
APPLICATION FILED MAY 19, 1902.

NO MODEL. 3 SHEETS—SHEET 3.

Witnesses:
S. C. Duvall.
R. E. Randle.

Inventor:
T. L. MARTIN,
by his attorney,
Robert W. Randle.

UNITED STATES PATENT OFFICE.

THOMAS L. MARTIN, OF LEWISBURG, KENTUCKY, ASSIGNOR OF ONE-HALF TO JOHN SNELL, OF LEWISBURG, KENTUCKY.

PRESERVING DEVICE.

SPECIFICATION forming part of Letters Patent No. 720,043, dated February 10, 1903.

Application filed May 19, 1902. Serial No. 108,003. (No model.)

*To all whom it may concern:*

Be it known that I, THOMAS L. MARTIN, a citizen of the United States, residing at Lewisburg, in the county of Logan and State of Kentucky, have invented new and useful Improvements in Preserving Devices, of which the following is a specification, which is a full, clear, and exact description of the invention, such as will enable others skilled in the art to which it appertains to make and use the same.

My present invention relates to preserving devices, more especially for removing the fermenting and decaying qualities from fruit or the like, whereby the fruit may be preserved from decay for a long period of time.

The object of my invention, broadly speaking, is the provision of a device for preserving fruit or the like by evaporation.

Another object is the provision of a device for preserving fruit or the like by means of a steam-blast, whereby the fermenting and decaying qualities of the fruit will be extracted and the fruit preserved in a fresh and perfect state for an indefinite length of time; and another object is the provision of a new article of manufacture in a preserving device of new and novel construction, strong and durable in its several parts, capable of a wide scope of efficiency and usefulness, and which can be manufactured and sold at a comparatively low price.

Other objects and advantages will appear from the following specification and from the drawings forming a part thereof, hereinafter referred to.

I attain the above and other objects by the arrangement and combination of the several parts illustrated in the drawings and hereinafter fully described, and specifically pointed out in the claims terminating this specification.

My invention consists in a preserving device embodying certain novel and peculiar features and details of construction, combinations, and relative disposition of parts, as hereinafter particularly set forth, illustrated in the drawings, and specifically pointed out in the claims.

Figure 2:
Figure 3:
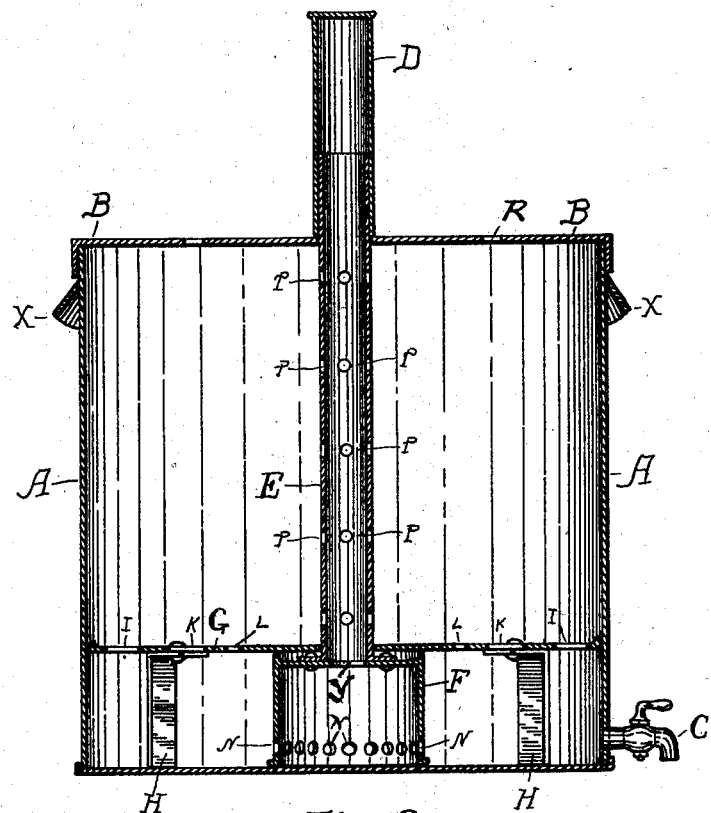
Figure 4:
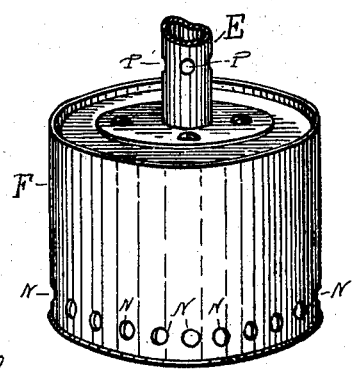
Figure 5:
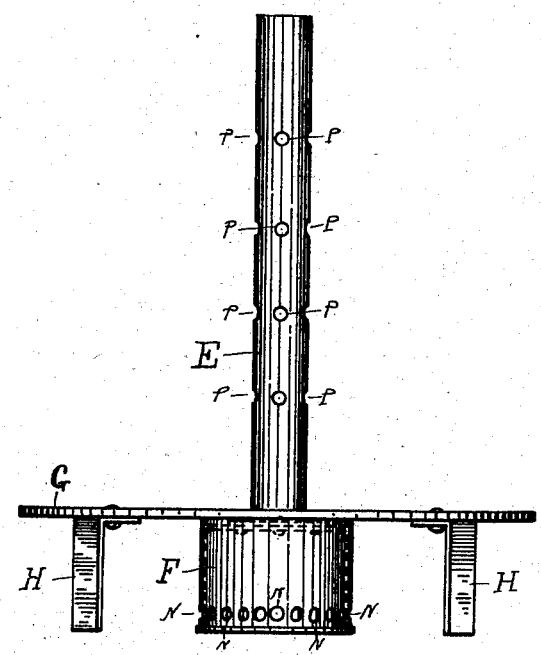
Figure 6:
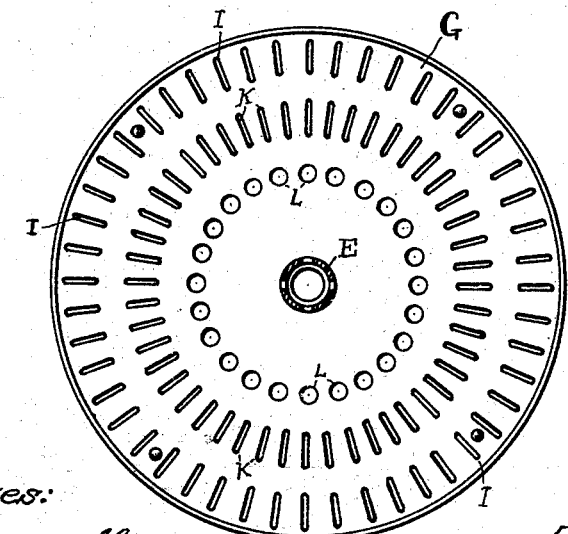

Referring now to the drawings, Figure 1 is a perspective view of a vessel constructed with the view of operating my invention therein and of which it forms a part. Fig. 2 is an enlarged detail view of the cap, which will be described. Fig. 3 is a vertical cross-section of my invention. Fig. 4 is a detail view of a portion of my invention, somewhat enlarged from the same portions shown in Fig. 3. Fig. 5 is a side elevation of the entire internal mechanism of my device, and Fig. 6 is a top plan of same.

Similar letters of reference denote and refer to like parts throughout the several views.

In the drawings, A represents a circular can with perpendicular walls, with a solid bottom permanently attached thereto and provided with a removable lid B.

C represents a faucet secured in the side of the can A, near the bottom thereof.

D represents a cap or hollow cylinder with one open end, the other end being permanently closed. The purpose of the cap D is to close the upper end of the pipe E, so that the steam from the chamber F may not escape outside the can A, but will be forced through the holes R into the interior of the can A.

E represents a pipe leading from the steam-chamber upward through and beyond the center of the lid B, by which the steam in the chamber F may be allowed to escape outside the can A when the cap D is removed.

F represents a circular steam-chamber, the upper end being closed except a central opening Y, which leads into the pipe E, the lower end being open and adapted to rest on the center of the inside of the bottom of the can A. The lower end of the pipe E is turned outward at right angles to its body, forming a flange X, which flange rests on and is secured to the center of the outside of the closed end of the steam-chamber F, as shown in Fig. 4. A hole is provided through the center of the top of chamber F, which communicates with the interior of the pipe E.

G represents a disk of a diameter just sufficient to neatly fit the interior of the can A and is provided with a hole Y through its center, through which passes the pipe E. The central portion of the disk G is adapted to rest on the chime of the steam-chamber F, as shown in Fig. 3, and to the outer portions of the disk G, on the under side thereof, are secured a plurality of legs H, which legs extend from the under side of the disk G, to which they are secured, to the bottom of the can A, on which they rest, Fig. 3. Through the disk G, I provide two rows of slots, which rows are in circles conforming to the contour of the disk. The outside row of slots is represented by I, and the inside row is represented by K, and within the latter I provide a circular row of round holes, (represented by L.) Through the walls of the steam-chamber F, around its entire circumference and near the lower edge thereof, I provide a row of holes N, which lead into the interior of said steam-chamber. Around the pipe E and through its walls I provide a number of vertical rows of holes P, which lead to the interior of said pipe E, and through the lid B, I provide a circular row of holes R.

X represents the handles, by which the device may be lifted or carried.

In operation the device is arranged substantially as shown in Figs. 1 and 3. The cap D is then removed from the pipe E, and a funnel is inserted in the top of the pipe E, into which a quantity of water is inserted, which will pass down into the space below the disk G. The lid D is then removed. A quantity of fruit to be preserved is placed on the disk G to any height desired. The lid B and the cap D are then replaced in position, as shown in Figs. 1 and 3. The device is then placed on a stove or over a fire to cause the water in the bottom of the can to boil. The steam from the boiling water will pass around and through the fruit, by which the fruit will be cooked and the sap extracted therefrom without the fruit coming in contact with the water. The portion of the bottom of the can beneath the chamber F will be heated to a greater extent than the remainder of the bottom, and for this reason a greater portion of the steam will be formed in the chamber F, which will pass up through the pipe E and then out of the holes P into the space occupied by the fruit. The steam will then pass down through the fruit, carrying with it the fermenting and decaying qualities of the fruit, through the slots I and K and the holes L into the space below the disk G, where it will pass through the holes N into the steam-chamber, to be again heated and returned, as before stated. Should the water become low, (which can be determined by the faucet C,) it can be replenished by removing the cap D and inserting it, as before stated, and should too much water be found in the can it may be drawn off through the faucet C. By this arrangement it is apparent that the fruit does not come into contact with the bottom of the vessel, and consequently there will be no danger of burning the fruit, as is common with ordinary cooking utensils. As the fruit cooked by this process will not come into contact with water, but will be cooked entirely by steam, it is apparent that the natural flavors of the fruit will be retained and that it can be preserved a much longer time.

Under certain circumstances it may be found preferable to allow a larger portion of the steam to escape than would naturally do so around the edges of the lid, and for this reason I provide the lid B with a number of holes R, through which the steam may escape. These openings may be closed, if desired, by placing a flat circular disk on top of the lid over said holes and encircling the cap D.

My invention is perfectly adapted to accomplish the results for which it is intended, and it is evident that changes in and modifications of the specific construction herein shown and described may be made and that analogous parts may be used to accomplish the same results without departing from the spirit of my invention or sacrificing any of the many advantages herein set forth.

Having now fully shown my invention and the best mode for its construction and use to me known at this time, what I claim as new, and desire to secure by Letters Patent of the United States, is—

1. In a fruit-preserving device in combination with receptacle-can A with vertical walls and provided with a lid with a central circular opening therein, of a circular steam-receptacle located in the bottom thereof, provided with row of openings around its periphery near the lower edge thereof the top of the receptacle being provided with an opening leading into the pipe E and the bottom being open, of the pipe E leading up from the steam-receptacle through and beyond the lid B and provided with a plurality of rows of holes therethrough, of the disk G of the diameter of the interior of the receptacle A provided with a plurality of slots I, K and L therethrough and provided with a plurality of legs H secured on the under side thereof extending to the bottom of the can A, all substantially as shown and described.

2. In a fruit-preserving device, the combination, of a can A provided with a lid B, a steam-receptacle located in the interior of the can with a pipe E leading up therefrom through and beyond the lid B, the pipe E with its lower end connected to the steam-receptacle and its upper end provided with a cap D, said cap D encircling and covering the projecting end of the pipe E, and the disk G resting on the top of the steam-receptacle with a plurality of apertures therethrough, all substantially as shown and described and for the purposes set forth.

In testimony whereof I have hereunto subscribed my name in the presence of two subscribing witnesses.

THOMAS L. MARTIN.

Witnesses:
W. R. BRUCE,
JOHN SNELL.